June 1, 1954   J. M. SHARF ET AL   2,680,083
METHOD AND DEVICE FOR CLEANING RINGS
Filed Sept. 2, 1949

Inventor
JOHN M. SHARF
EDISON POWERS by
Walter F. Kaufman
Attorney

Patented June 1, 1954

2,680,083

UNITED STATES PATENT OFFICE 2,680,083

METHOD AND DEVICE FOR CLEANING RINGS

John M. Sharf, Lancaster, and Edison Powers, East Lampeter Township, Lancaster County, Pa., assignors to Armstrong Cork Company, Lancaster, Pa., a corporation of Pennsylvania Application September 2, 1949, Serial No. 113,695

11 Claims. (Cl. 134—6)

1

This invention relates to a method and device for cleaning rings of yielding and resilient materials such as closure liner rings made of rubber or synthetic rubber compounds and which in use are assembled with metal shells in the formation of side seal closures.

Such rings are generally formed by disposing a tubular body of the composition upon a forming mandrel and curing the composition on the mandrel by vulcanization. The composition is then buffed or ground on its outer surface to provide a body having an outer circumference which is concentric with the central opening formed by the mandrel. The tubular body thus formed is then severed into rings, generally by the use of a multiple knife-splitting machine in which the knives engage the composition mounted on a mandrel and in rotation therewith. The rings are then removed from the mandrel, placed upon a cardboard core, and wrapped for shipment to the closure manufacturer.

In the preparation of food closures it is particularly important that small particles of rubber compound which normally adhere to the various surfaces of the rings be completely removed before assembly of the ring with the metal shell, for otherwise these particles will tend to become lodged in the shell or adhere to the sealing ring and may contaminate the food product to which the closure is applied.

There is also the problem of feeding the rings individually to the assembly machine so that one ring will be supplied to each shell as it is presented at the assembly station. There is a tendency for the rings to stick together; and, because of their frictional character, they do not feed properly. This problem is aggravated when the liners are packaged on central cores in stacked relationship.

An object of the invention is to provide a method by the practice of which rings may be cleaned and if they tend to stick together may be simultaneously separated and slightly burnished on their side surfaces to prevent adherence of the rings one to the other.

Another object of the invention is to provide a device which will effectively remove adherent particles from the surfaces of rings of resilient material such as closure liner rings of rubber or synthetic rubber compounds.

Another object of the invention is to provide a device which will automatically separate rings of resilient material, such as the closure liner rings mentioned above, and will burnish the surfaces thereof to a slight degree at least and thus make possible easy feeding without adherence of the rings to one another.

2

According to the invention, the device comprises a mandrel upon which a plurality of rings to be treated may be disposed. The mandrel is much smaller in cross section than the opening in the rings so that the rings hang loosely thereon and are free for substantial displacement in generally radial directions. A rotatable brush with resilient bristles is disposed with respect to the mandrel so as to engage the rings positioned thereon, the path defined by the periphery of the brush, when it is in rotation, intersecting the periphery of the rings positioned upon the mandrel. This effects displacement of the rings with respect to the mandrel, separating the rings, cleaning, and burnishing them. Preferably the mandrel is in the nature of a hollow sleeve which is mounted eccentrically upon a mounting rod and is free for limited swinging movement with respect to the brush to assist in moving the rings erratically. The brush is preferably mounted with its axis below the axis of the sleeve support and is rotated in a direction which is effective for causing the brush to lift the rings on the mandrel and thus slide them one with respect to the other and enhance the burnishing action which is effected on the surfaces of the rings, particularly the side surfaces. It is also preferred to have the brush so constructed and arranged that it will engage the rings one after the other along the length of the supporting mandrel, and this can be conveniently effected by having the bristles of the brush disposed as a helix with a relatively long pitch. This aids in securing rapid and complete separation of the rings for proper cleaning and burnishing.

The invention has been illustrated in the attached drawing, in which.

Figure 1:
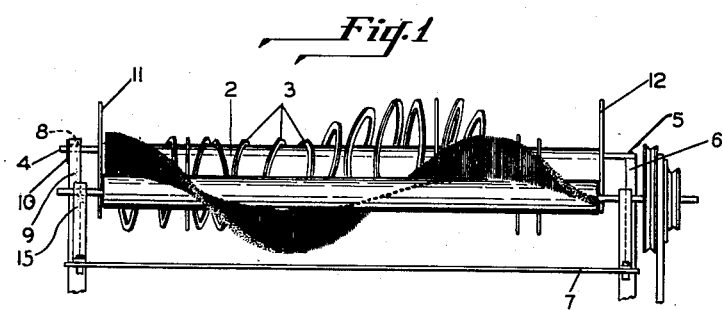
Figure 1 is a front elevational view illustrating one embodiment of the device of the present invention.
Figure 2:
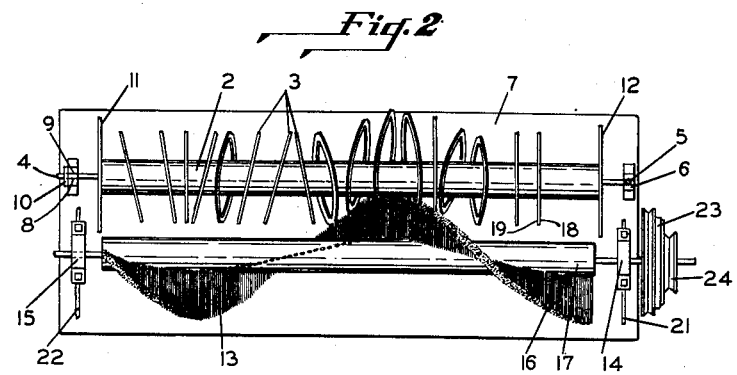
Figure 2 is a top plan view of the device shown in Figure 1.
Figure 3:
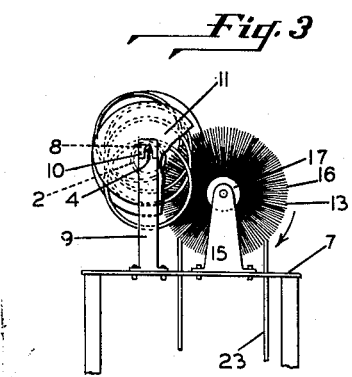
Figure 3 is a side elevation of the device shown in Figures 1 and 2.

In the embodiment illustrated in Figures 1 to 3 there is a supporting mandrel 2 which is in the nature of a hollow cylindrical sleeve. The mandrel 2 receives a plurality of rings 3 which are to be treated. The mandrel 2 is mounted eccentrically for free swinging movement upon a rod 4. One end of the rod 4 is pivoted at 5 to a post 6 secured to a table 7. The other end of the rod 4 is received within a slot 8 in a post 9 also secured to the table. A keeper 10 is provided on post 9 to hold the rod 4 in position. The mandrel 2 has a flange 11 formed thereon adjacent one end, and the rod 4 is provided with a collar 12 which is disposed in such position as to abut the end of the mandrel opposite the flange 11 when the mandrel is positioned on the rod. Thus the rings 3 are confined between the flange 11 and collar 12 during treatment.

The mandrel is of a size which will permit free movement of the rings in a generally radial direction, and the number of rings disposed on the mandrel is such that the rings are free for movement along the axis of the mandrel. For example, in the treatment of rings having a center opening or inside diameter of about 2½" and a radial thickness of .165", providing an outside diameter of about 2 13/16", each ring being about .050" thick (axial dimension), the mandrel may be about 1⅜" o. d., the distance from the flange 11 to the collar 12 may be about 15", and the mandrel may carry about 250 rings. These dimensions are not critical and will vary with rings of different size. The rings should, however, be free for both radial and axial movement with respect to the mandrel. The radial movement should be at least equal to the radial thickness to secure proper burnishing and for best results should be substantially greater.

There is also secured on table 7 a brush 13 mounted for rotation in bearings 14 and 15. The brush is preferably formed with a single, relatively narrow band of resilient bristles 16 which are disposed in a helix on a cylindrical supporting body 17. The bristles are preferably of nylon, but other natural or artificial bristles may be substituted. The bristles should be relatively rigid but resilient and should be long enough to properly engage the side surfaces 18 and 19 of the rings 3. It will be noted by reference to Figure 3 that the axis of rotation of brush 13 is disposed below the axis of the supporting rod 4 for the mandrel 2, and the brush is rotated in the direction of the arrow. This results in a lifting of the rings with respect to the mandrel as they are engaged by the brush. The bearings 14 and 15 are mounted over slots 21 and 22 in the table 7 and may be adjusted to bring the bristles 16 into a position where their path of travel is closely adjacent to the surface of mandrel 2, insuring good contact between the bristles and the side surfaces 18 and 19 of the rings 3 on the mandrel. The brush 13 is power-driven by a motor or the like (not shown) through a driving belt 23 trained over a pulley 24 secured to the shaft of the rotary brush 13. In the embodiment illustrated, the brush has a steel-supporting body 17 about 1¼" in diameter, and the nylon bristles 16 thereon when new project about 1¼" from the cylindrical surface of the body. They are disposed as a helix with a pitch of about 12" and the band of bristles is about ¼" wide at the surface of the brush. The brush is rotated at about 1000 R. P. M.

Figure 4:
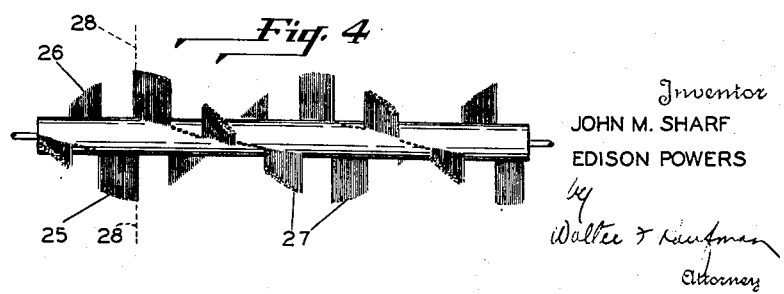
Figure 4 is a top plan view of a modified brush structure.

Figure 4 shows a modified type of brush which has two helically disposed sections 25 and 26 of bristles. The bristles are disposed as spaced, narrow segments 27 which may be about 1" long and ¼" wide at the face. The section 26 is offset about 180° from the section 25 and the segments 27 of both sets are so arranged that their paths when in rotation will intersect all of the rings on the mandrel with which the brush is used. The bristle segments may be arranged to overlap slightly in their paths of travel as indicated by the dotted lines 28 in Figure 4.

In the operation of the device, the keeper 10 is lifted and mounting rod 4 is swung out of support 9, pivoting about pivot 5 on support 6. Mandrel 2 is removed and placed in a vertical position on table 7 with flange 11 lying flat therein. A quantity of rings 3 to be cleaned and separated are dropped over the mandrel and lie in a stack thereon, against flange 11. The mandrel with the rings 3 thereon is then slipped over the supporting rod, the mandrel being brought up into contact with collar 12 which is fixed on supporting rod 4. The rod 4 is then pivoted about pivot 5 to bring supporting rod 4 within slot 8 in support 9 and keeper 10 is lowered. This locks the supporting rod 4 in position. The brush is then rotated. It will be noted by reference to Figure 2 that the rings 3 lie in the path of the bristles 16 of the brush 13 and that when engaged by the brush 13 the rings 3 are lifted and moved radially with respect to the mandrel 2. The showings of Figures 1 to 3 are idealized to show the approximate positions of the rings at a selected instant during rotation of the brush; the movements of the rings are vagarious and difficult to illustrate.

The position of the rings 3 has been shown after they have been separated one from the other. This occurs in a relatively short period of time after the brush has been in rotation. Those rings which tend to stick together are separated by the action of the brush 13 which engages the rings seriatim. The rings have been shown in relatively widely spaced relationship in the drawing for sake of clearness. In actual practice with a stack of 250 rings .050" thick disposed on a 15" mandrel the rings will not be spaced as widely apart as shown. As the rings are engaged by the brush, they are urged into engagement with the mandrel 2; and since it is eccentrically mounted for a swinging movement, the mandrel oscillates or swings slightly back and forth about the supporting rod. This assists in the cleaning and separating of the rings, for its motion is not in unison with the motion of the brush or the rings which are engaged by the brush. As the rings are engaged by the bristles, the bristles are displaced or bent and some come into contact with the sides of the rings 3 and remove particles which may adhere to the side surfaces. The outer peripheries of the rings are engaged by the bristles also, and this removes any particles which may be adherent thereto. The inner surfaces of the rings which lie in engagement with the mandrel 2 are cleaned by rubbing contact with the mandrel and by contact with one another. The brushing operation in combination with the sliding of the rings one upon the other and over the mandrel surface tends to impart a slight burnishing to the surfaces of the rings and they slide relatively freely one with respect to the other during subsequent feeding of the rings to the assembly machine.

After brushing for a period of about one to two minutes in the typical example chosen for illustration, the keeper 10 is lifted, the rod 4 is pivoted about pivot 5, and the mandrel 2 is removed from the supporting rod 4. The rings may then be fed directly to a stacking device on the assembly machine; or, if the cleaning operation is performed at the plant where the rings are fabricated, they may be disposed upon a supporting tube and then wrapped for shipment.

While we have illustrated and described a preferred embodiment of the invention, it will be understood that the same is not limited thereto but may be otherwise embodied and practiced within the scope of the following claims.

We claim:

1. In a method of cleaning rings, the steps comprising mounting a plurality of rings upon a supporting mandrel with the rings disposed for free swinging motion in directions generally radially thereof and for limited movement generally axially thereof and progressively impacting said rings at intervals with a rotating brush, said impacting force being applied to said rings at locations below and laterally spaced from their line of support and in a direction which is generally toward said line of support as the brush engages said rings, said rings falling freely to their line of support between impacts.

2. In a method of cleaning and burnishing rings of yieldable resilient material, the steps comprising supporting said rings upon a cylindrical supporting surface with the rings free for swinging motion in directions generally radially thereof and for limited movement generally axially thereof and progressively impacting said rings disposed on said support with a rotating brush to move said rings generally radially, one after the other, said impacting force being applied to said rings at locations below and laterally spaced from their line of support and being directed generally upwardly to cause said rings to slide one with respect to the other to effect a burnishing action on the surfaces of said rings in sliding engagement with one another.

3. In a method of cleaning and separating rings of yieldable resilient material, the steps comprising supporting said rings to be cleaned and separated upon a substantially cylindrical supporting surface which is free for eccentric swinging movement, said rings being free for eccentric swinging movement on said support independent of said swinging movement of said support, and bringing the bristles of a brush into engagement with the rings progressively along the axis of said supporting surface with said bristles engaging the exposed peripheries of the rings and the side surfaces thereof, said brush engaging said rings below their line of support on said cylindrical supporting surface to progressively move said rings upwardly with respect to said support and separate said rings.

4. In a device of the class described, the combination of a substantially cylindrical mandrel upon which a plurality of rings to be treated may be disposed, the outer diameter of the mandrel for engagement with the rings being substantially less than the inner diameter of the rings it is to receive, means for supporting said mandrel for eccentric swinging motion, and a rotatable brush having resilient bristles disposed for progressive engagement with rings positioned upon said mandrel, the path defined by the periphery of said brush when in rotation sweeping along the length of said mandrel closely adjacent to the periphery thereof to engage the outer peripheral and the side surfaces of rings disposed on said mandrel and projecting beyond the periphery thereof.

5. In a device of the class described, the combination of a mandrel upon which a plurality of rings to be treated may be disposed, the outer diameter of the mandrel for engagement with the rings being substantially less than the inner diameter of the rings it is to receive, means for supporting said mandrel for eccentric swinging motion, and a rotatable brush having resilient bristles disposed for progressive engagement with rings positioned upon said mandrel, the axis of said brush being disposed below the axis of said mandrel, the path defined by the periphery of said brush when in rotation sweeping along the length of said mandrel closely adjacent to the periphery thereof to engage the outer peripheral and the side surfaces of rings disposed on said mandrel and projecting beyond the periphery thereof.

6. In a device of the class described, the combination of a mandrel upon which a plurality of rings to be treated may be disposed, the outer diameter of the mandrel for engagement with the rings being substantially less than the inner diameter of the rings it is to receive, means for supporting said mandrel for eccentric swinging motion, a rotatable brush having resilient bristles disposed for progressive engagement with rings positioned upon said mandrel, the axis of said brush being disposed below the axis of said mandrel and laterally thereof, the path defined by the periphery of said brush when in rotation sweeping along the length of said mandrel closely adjacent to the periphery thereof to engage the outer peripheral and the side surfaces of rings disposed on said mandrel and projecting beyond the periphery thereof, and means for rotating said brush to progressively lift said rings upwardly on said mandrel.

7. In a device of the class described, the combination of a mandrel upon which a plurality of rings to be treated may be disposed for movement both axially and radially with respect to said mandrel, the outer diameter of the mandrel for engagement with the rings being substantially less than the inner diameter of the rings it is to receive, the allowable radial movement being at least substantially equal to the radial thickness of the rings to be treated, means for supporting said mandrel for eccentric swinging motion, and a rotatable brush having resilient bristles disposed for progressive engagement with rings positioned upon said mandrel, said bristles being disposed in a helical path along the mandrel, the path defined by the periphery of said bristles when said brush is in rotation sweeping along the full effective length of said mandrel closely adjacent to the periphery thereof to engage the outer peripheral and the side surfaces of rings disposed on said mandrel and projecting beyond the surface thereof.

8. In a device of the class described, the combination of a supporting mandrel mounted for eccentric swinging motion and adapted to receive a plurality of rings thereon for treatment, with the rings being free for substantial movement radially with respect to the axis of the mandrel, means for supporting said mandrel for eccentric swinging motion, and a rotatable bristled brush mounted with its axis below the axis of the mandrel and with the path defined by the bristles of the brush when in rotation lying close to the periphery of the mandrel to engage the outer and side surfaces of rings disposed thereon, said bristles being disposed on said brush to engage said rings seriatim as the brush is rotated to cause adjacent rings to move radially with respect to one another to effect a separation thereof along the length of the mandrel.

9. In a device of the class described, the combination of a substantially horizontally disposed supporting sleeve, a rod upon which said sleeve is mounted for eccentric swinging motion, said sleeve being adapted to receive a plurality of rings thereon for free movement both radially and axially of said sleeve, and a rotatable brush having resilient bristles disposed for progressive engagement with rings disposed on said sleeve, the path defined by said brush intersecting said rings on said sleeve throughout a substantial portion of the radial thickness of said rings.

10. In a device of the class described, the combination of a substantially cylindrical mandrel upon which a plurality of rings to be treated may be disposed for free swinging movement in a generally radial direction, means for supporting said mandrel for eccentric swinging motion, and a rotary brush engageable with said rings to impart a swinging motion thereto to bring the inner surfaces of said rings into engagement with said mandrel at points disposed laterally of their points of free swinging support, said brush comprising two helically disposed sections of bristles spaced from one another and each section being made up of narrow spaced segments of bristles, the segments being disposed so that the composite path defined by both sections of bristles will cover substantially the whole effective length of the mandrel.

11. In a device of the class described, the combination of claim 10 in which the helical sections of bristles are disposed about 180° from each other and are of the same pitch.

References Cited in the file of this patent

UNITED STATES PATENTS

| Number | Name | Date |
|---|---|---|
| 1,559,127 | Perrault | Oct. 27, 1925 |
| 1,588,342 | Stevens | June 8, 1926 |
| 1,734,986 | Williams | Nov. 12, 1929 |
| 1,749,822 | Lakeman | Mar. 11, 1930 |
| 1,802,587 | Tavender | Apr. 28, 1931 |
| 2,083,517 | Larig | June 8, 1937 |
| 2,277,657 | Pinnelli | Mar. 24, 1942 |
| 2,334,714 | Knight | Nov. 23, 1943 |
| 2,376,945 | Stine | May 29, 1945 |
| 2,526,542 | Davies | Oct. 17, 1950 |